United States Patent
Hanioka et al.

(10) Patent No.: US 12,040,725 B2
(45) Date of Patent: Jul. 16, 2024

(54) POWER CONVERSION DEVICE AND ROTARY MACHINE DRIVE SYSTEM

(71) Applicant: Mitsubishi Electric Corporation, Tokyo (JP)

(72) Inventors: Shota Hanioka, Tokyo (JP); Masahiro Iezawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 17/911,419

(22) PCT Filed: Apr. 10, 2020

(86) PCT No.: PCT/JP2020/016190
§ 371 (c)(1),
(2) Date: Sep. 14, 2022

(87) PCT Pub. No.: WO2021/205665
PCT Pub. Date: Oct. 14, 2021

(65) Prior Publication Data
US 2023/0105607 A1    Apr. 6, 2023

(51) Int. Cl.
*H02M 7/5387* (2007.01)
*H02M 1/00* (2007.01)
(Continued)

(52) U.S. Cl.
CPC ....... *H02M 7/5387* (2013.01); *H02M 1/0009* (2021.05); *H02M 1/08* (2013.01); *H02M 1/385* (2021.05); *H02P 27/06* (2013.01)

(58) Field of Classification Search
CPC .. H02M 7/5387; H02M 1/385; H02M 1/0009; H02M 1/08; H02P 27/06
(Continued)

(56) References Cited

U.S. PATENT DOCUMENTS 9,035,580 B2    5/2015  Suzuki et al.
2020/0395881 A1*  12/2020  Hanioka ............... H02P 27/085

FOREIGN PATENT DOCUMENTS

JP    H1023760 A     1/1998
JP    2000083387 A   3/2000
(Continued)

OTHER PUBLICATIONS

Hanioka (WO 2019180763 A1)Power Conversion Device and Rotary Machine Driving System Date Published Sep. 26, 2019 (Year: 2019).*
(Continued)

*Primary Examiner* — Jorge L Carrasquillo
(74) *Attorney, Agent, or Firm* — XSENSUS LLP

(57) ABSTRACT

A power conversion device includes a switching signal generation unit that generates switching signals so that time points of at least one of pairs synchronize with each other. A first pair includes a rising time point at a first junction point of a first single-phase leg, and a falling time point at a second junction point of a second single-phase leg. A second pair includes a falling time point at the first junction point and a rising time point at the second junction point. The switching signal generation unit determines time points to turn on or turn off for upper arm switching element and a lower arm switching element based on phase currents respectively at a rising time point and at a falling time point of the terminal voltages.

10 Claims, 12 Drawing Sheets

(51) Int. Cl.
*H02M 1/08* (2006.01)
*H02M 1/38* (2007.01)
*H02P 27/06* (2006.01)

(58) Field of Classification Search
USPC .......................................................... 318/504
See application file for complete search history.

(56) References Cited

FOREIGN PATENT DOCUMENTS

| JP | 2007295786 A | 11/2007 |
|---|---|---|
| JP | 2011091949 A | 5/2011 |
| JP | 2013-225994 A | 10/2013 |
| JP | 2017-38443 A | 2/2017 |
| WO | 2014/073247 A1 | 5/2014 |
| WO | 2019/180763 A1 | 9/2019 |

OTHER PUBLICATIONS

Ichiki (JP 2007295786 A) Power Conversion Apparatus Date Published Nov. 8, 2007 (Year: 2007).*
Indian Office Action issued Sep. 11, 2023 in corresponding Indian Patent Application No. 202227054683 (with English translation), 5 pages.
International Search Report and Written Opinion mailed on Jun. 30, 2020, received for PCT Application PCT/JP2020/016190, filed on Apr. 10, 2020, 8 pages including English Translation.
Lai et al., "Optimal Common-Mode Voltage Reduction PWM Technique for Inverter Control With Consideration of the Dead-Time Effects—Part I: Basic Development", IEEE Transactions On Industry Applications, vol. 40, No. 6, Nov./Dec. 2004, pp. 1605-1612.
Kato et al., "Common-Mode Voltage Reduction with Two-Phase Modulation in Three-Level PWM Inverter", IEEE ECCE, 2013, pp. 5349-5354.

\* cited by examiner

POWER CONVERSION DEVICE AND ROTARY MACHINE DRIVE SYSTEM

CROSS-REFERENCE TO RELATED APPLICATION

The present application is based on PCT filing PCT/JP2020/016190, filed Apr. 10, 2020, the entire contents of which are incorporated herein by reference.

FIELD

The present disclosure relates to a power conversion device that controls an output voltage by turning on and off of switching elements, and to a rotary machine drive system including such power conversion device to drive a rotary machine.

BACKGROUND

In a power conversion device, a switching element performs switching operation to change the terminal voltage of that phase. This causes a leakage current to occur due to a stray capacitance to ground, thereby causing electromagnetic noise.

A rotary machine drive system including a power conversion device has a requirement on electromagnetic noise dependent on the product class. This requires measures to be taken against electromagnetic noise to prevent electromagnetic noise occurring in a power conversion device from exceeding a regulation value. A typical countermeasure against electromagnetic noise is use of a noise filter including passive elements; however, there is a problem in that room is necessary to install the filter in the power converter unit, and the manufacturing cost increases.

With such technological background, Patent Literature 1 below suggests a technology for reducing electromagnetic noise by adjustment of the phase of carrier for determining turning on and off of a switching element.

CITATION LIST

Patent Literature

Patent Literature 1: WO 2014/073247 A

SUMMARY

Technical Problem

However, no detailed description is given, in the method of Patent Literature 1, of estimation of a terminal voltage during a dead time provided to prevent short-circuiting that may be caused by simultaneous turning on of switching elements of upper and lower arms. Thus, the method of Patent Literature 1 includes a problem in that an effect of reducing electromagnetic noise associated with an out-of-synchronization corresponding to the dead time, is insufficient.

The present disclosure has been made in view of the foregoing, and it is an object to provide a power conversion device capable of reducing electromagnetic noise due to an out-of-synchronization corresponding to the dead time.

Solution to Problem

To solve the problems and achieve the object described above, a power conversion device according to the present disclosure is a power conversion device for converting direct current (DC) power into three-phase alternating current (AC) power for a load, and includes a power converter and a control device. The power converter includes a plurality of single-phase legs being connected in parallel with one another. Each of the multiple single-phase legs includes an upper arm switching element and a lower arm switching element connected in series with each other. The upper arm switching element and the lower arm switching element are connected to each other at a junction point, and the junction point is connected to the load. The control device controls switching operation of the upper arm switching element and of the lower arm switching element. The control device includes a switching signal generation unit. The switching signal generation unit generates switching signals so that time points of a first pair synchronize with each other. The first pair includes a rising time point of raising a terminal voltage at a first junction point of a first single-phase leg, and a falling time point of lowering a terminal voltage at a second junction point of a second single-phase leg, the first junction point being connected to the load, the second junction point being connected to the load. Alternatively, the switching signal generation unit generates switching signals so that time points of a second pair synchronize with each other. The second pair includes a falling time point of lowering the terminal voltage at the first junction point and a rising time point of raising the terminal voltage at the second junction point. The switching signal generation unit determines a time point to turn on or turn off the upper arm switching element and a time point to turn on or turn off the lower arm switching element based on phase currents respectively at the rising time point and at the falling time point of the terminal voltages.

Advantageous Effects of Invention

A power conversion device according to the present disclosure provides an advantage in being capable of reducing electromagnetic noise due to an out-of-synchronization corresponding to the dead time.

DESCRIPTION OF EMBODIMENTS

A power conversion device and a rotary machine drive system according to an embodiment of the present disclosure will be described in detail below with reference to the accompanying drawings. Note that the following description refers to electrical connection and physical connection without distinction as simply "connection".

Embodiment

Figure 1:
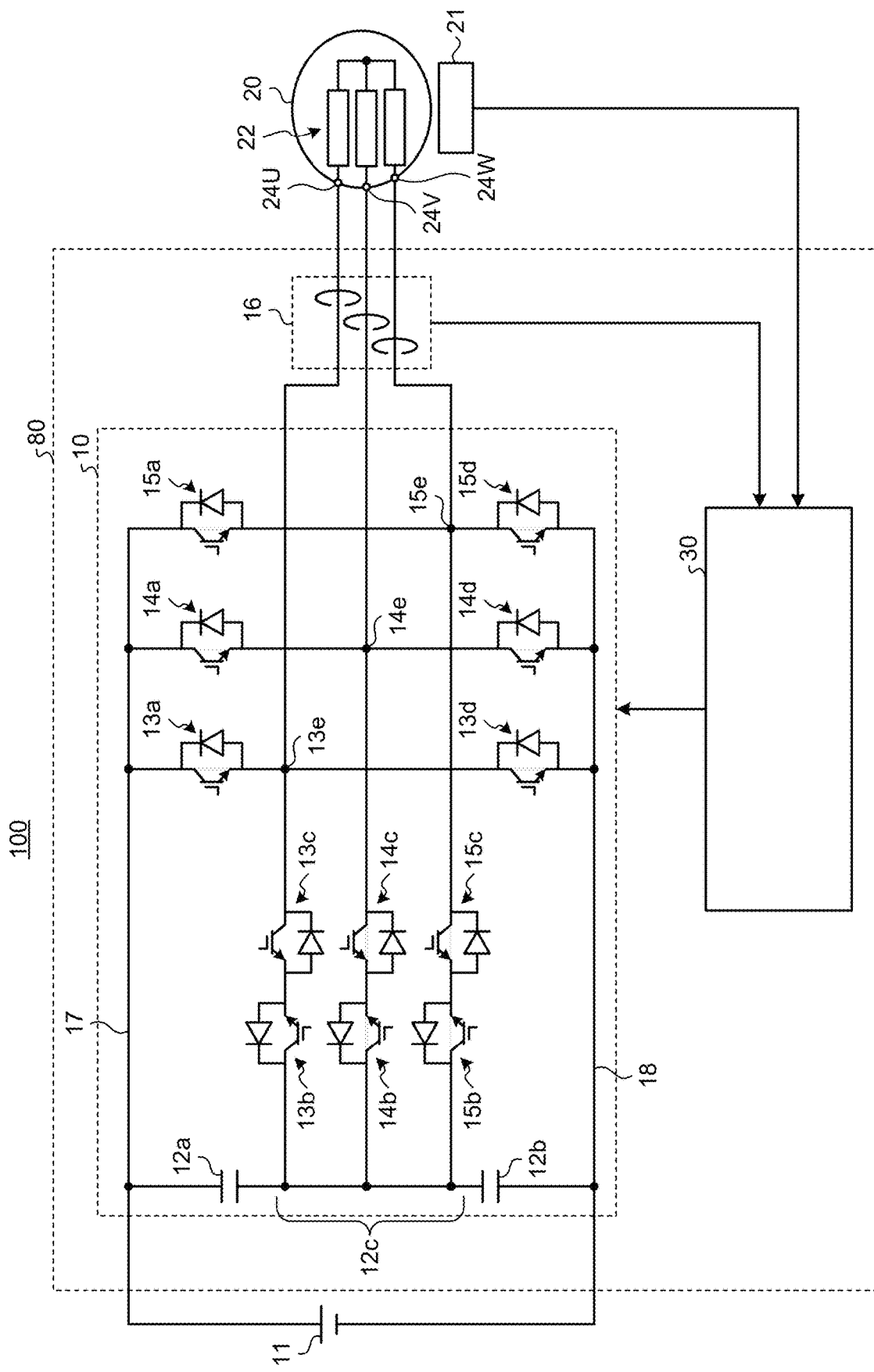
FIG. 1 is a diagram illustrating a configuration of a rotary machine drive system including a power conversion device according to an embodiment.

FIG. 1 is a diagram illustrating a configuration of a rotary machine drive system 100 including a power conversion device 80 according to an embodiment. The rotary machine drive system 100 according to the embodiment illustrated in FIG. 1 includes a direct current (DC) power supply 11 and a power conversion device 80. The power conversion device 80 includes a power converter 10, a control device 30, and a current detector 16. The rotary machine drive system 100 is connected with a rotary machine 20, which is a load. The rotary machine 20 is driven by electrical power supplied from the rotary machine drive system 100.

The power conversion device 80 converts DC power supplied from the DC power supply 11 into three-phase alternating current (AC) power for the rotary machine 20, and supplies the three-phase AC power to the rotary machine 20. The phases of the three phases are hereinafter designated phase U, phase V, and phase W.

FIG. 1 illustrates, by way of example, the rotary machine 20 having a three-phase winding 22. The rotary machine 20 includes a phase-U terminal 24U, a phase-V terminal 24V, and a phase-W terminal 24W. The rotary machine 20 includes an angle detector 21 for detecting the rotation angle of a rotor (not illustrated) in the rotary machine 20. An example of the angle detector 21 is a Hall sensor.

The power converter 10 includes switching elements 13a, 13b, 13c, and 13d (hereinafter designated "13a to 13d" as appropriate, where similar notation is used for other elements), switching elements 14a to 14d, switching elements 15a to 15d, and capacitors 12a and 12b.

The switching elements of the power converter 10 each include an insulated gate bipolar transistor (IGBT) and a diode connected in inverse parallel to the IGBT. Connection in inverse parallel means that the anode side of the diode is connected to the terminal corresponding to the emitter of the IGBT, and the cathode side of the diode is connected to the terminal corresponding to the collector of the IGBT.

FIG. 1 illustrates, by way of example, a case in which the transistor in each of the switching elements is, but not limited to, an IGBT. A metal-oxide-semiconductor field-effect transistor (MOSFET) may be used instead of an IGBT. Note that use of a MOSFET in each of the switching elements results in occurrence of a parasitic diode in the element. Thus, when a MOSFET is used, utilization of this parasitic diode eliminates the need for the diode to be connected in inverse parallel.

The switching elements 13a to 13d each operate as a switching element of phase U. The switching elements 14a to 14d each operate as a switching element of phase V. The switching elements 15a to 15d each operate as a switching element of phase W. The set of these switching elements 13a to 13d, 14a to 14d, and 15a to 15d allows the power converter 10 to operate as a three-level inverter. Note that the power converter 10 illustrated in FIG. 1 is configured such that the switching elements of each phase are in a T-shaped connection configuration, and is therefore sometimes called "T-type three-level inverter".

The switching elements 13a, 14a, and 15a are connected to a DC bus 17 at a higher-potential. The switching elements 13d, 14d, and 15d are connected to a DC bus 18 at a lower-potential. The DC bus 17 is an electrical wire connected to the positive side of the DC power supply 11. The DC bus 18 is an electrical wire connected to the negative side of the DC power supply 11. The switching elements 13a, 14a, and 15a disposed on the higher potential side are each referred to herein as "upper arm switching element" as appropriate, and the switching elements 13d, 14d, and 15d disposed on the lower potential side are each referred to herein as "lower arm switching element" as appropriate.

A pair of the switching elements 13a and 13d, a pair of the switching elements 14a and 14d, and a pair of the switching elements 15a and 15d each form a single-phase leg, and are connected in parallel with one another.

The capacitors 12a and 12b are connected in series with each other between the DC bus 17 and the DC bus 18 in this order. Note that the voltage between the DC bus 17 and the DC bus 18 is referred to as "bus voltage". The bus voltage is equal to the DC voltage output by the DC power supply 11. In addition, the value of the bus voltage is denoted by "Vdc" as appropriate.

A pair of the switching elements 13b and 13c, a pair of the switching elements 14b and 14c, and a pair of the switching elements 15b and 15c are each connected in series with each other to each operate as a bidirectional switch element.

The pair of the switching elements 13b and 13c is connected between a junction point 13e and a junction point 12c. The junction point 13e is the junction point between the switching element 13a and the switching element 13d. The junction point 12c is the junction point between the capacitor 12a and the capacitor 12b. The junction point 12c is sometimes called "neutral point".

Similarly, the pair of the switching elements 14b and 14c is connected between a junction point 14e and the junction point 12c. The junction point 14e is the junction point between the switching element 14a and the switching element 14d. The pair of the switching elements 15b and 15c is connected between a junction point 15e and the junction point 12c. The junction point 15e is the junction point between the switching element 15a and the switching element 15d.

The junction point 13e is connected to the phase-U terminal 24U of the rotary machine 20. The junction point 14e is connected to the phase-V terminal 24V of the rotary machine 20. The junction point 15e is connected to the phase-W terminal 24W of the rotary machine 20. The current detector 16 is provided to the electrical wires.

When the switching element 13a is in an On state and the other switching elements are in an Off state in phase U, a positive potential of the DC power supply 11 appears at the junction point 13e, and this potential is applied to the phase-U terminal 24U. In addition, when the switching element 13d is in an On state and the other switching elements are in an Off state in phase U, a negative potential of the DC power supply 11, i.e., a zero potential, appears at the junction point 13e, and this potential is applied to the phase-U terminal 24U. Moreover, when either the switching element 13b or the switching element 13c is in an On state and both the switching elements 13a and 13d are in an Off state, the potential at the junction point 12c, i.e., the neutral point potential, appears at the junction point 13e, and this potential is applied to the phase-U terminal 24U. Note that the capacitors 12a and 12b basically have the same capacitance, meaning that the neutral point potential is half the bus voltage, i.e., "Vdc/2".

The foregoing description is directed to an operation relating to phase U, and the switching elements of phase V and of phase W operate similarly. Accordingly, a voltage at a potential among three levels, i.e., the positive potential, the neutral point potential, and the zero potential, is applied to each of the phase-U terminal 24U, the phase-V terminal 24V, and the phase-W terminal 24W by a combination of switching operations of the switching elements of the corresponding phase. Thus, the power converter 10 operates as a three-level inverter. Note that the following description refers to the voltages applied to the phase-U terminal 24U, to the phase-V terminal 24V, and to the phase-W terminal 24W of the rotary machine 20 each as "terminal voltage", and the terminal voltages of the phases are denoted by "vun", "vvn", and "vwn" as appropriate.

The current detector 16 detects a phase current flowing for each of the phases of the rotary machine 20. A value detected by the current detector 16 is input to the control device 30. The control device 30 controls the switching elements of the power converter 10 based on detection values detected by the angle detector 21 and by the current detector 16. The control operation will be described in detail later.

Figure 2:
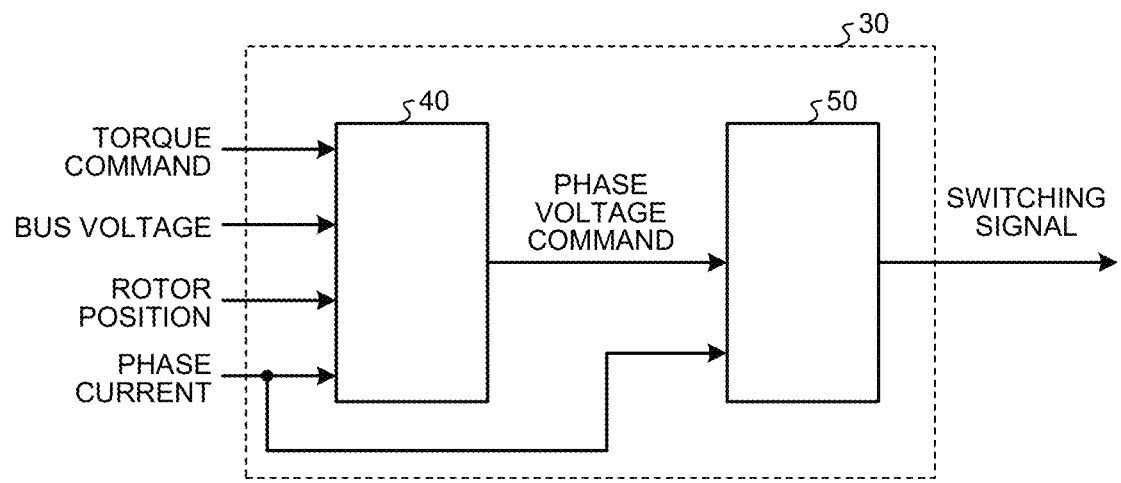
FIG. 2 is a block diagram illustrating a functional configuration of the control device in the embodiment.

A configuration of the control device 30 will next be described. FIG. 2 is a block diagram illustrating a functional configuration of the control device 30 in the embodiment. The control device 30 includes a voltage command generation unit 40 and a switching signal generation unit 50.

As illustrated in FIG. 2, the voltage command generation unit 40 receives a torque command, the bus voltage, a rotor position detected by the angle detector 21, and the phase current detected by the current detector 16. Note that a current command may be used instead of the torque command. The voltage command generation unit 40 computes a phase voltage command based on the torque command, the bus voltage, the rotor position, and the phase current.

In addition, as illustrated in FIG. 2, the switching signal generation unit 50 receives the phase current detected by the current detector 16 and the phase voltage command computed by the voltage command generation unit 40. The switching signal generation unit 50 generates a switching signal based on the phase current and on the phase voltage command, and outputs the switching signal.

Figure 3:
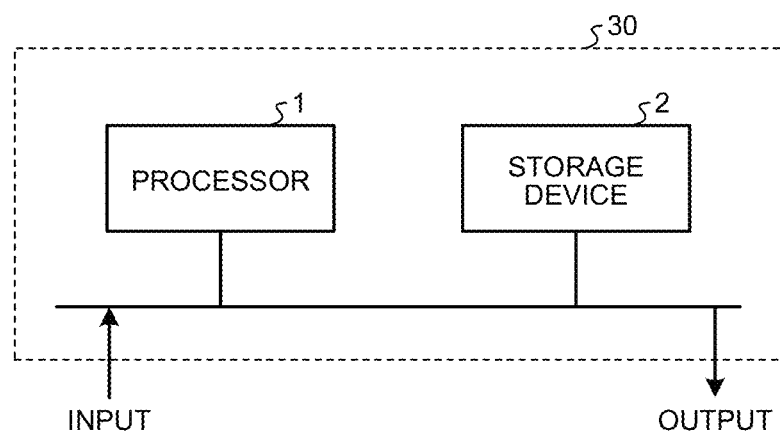
FIG. 3 is a diagram illustrating an example of hardware configuration for implementing functionality of the control device in the embodiment.

FIG. 3 is a diagram illustrating an example of hardware configuration for implementing functionality of the control device 30 in the embodiment. The functionality described above and the functionality described below of the control device 30 can be implemented by a combination of a processor 1 and a storage device 2 as illustrated in FIG. 3. Although not illustrated, the storage device 2 includes a volatile storage device, a typical example of which is a random access memory, and a non-volatile auxiliary storage device, a typical example of which is a flash memory. Note that an auxiliary storage device such as a hard disk drive may be included instead of a flash memory.

The processor 1 executes a program read from the storage device 2 to perform part or all of the functionality of the control device 30. In this case, a program is read from the auxiliary storage device via the volatile storage device into the processor 1. The processor 1 may output data such as a computation result to the volatile storage device of the storage device 2. Otherwise, the processor 1 may store data in the auxiliary storage device via the volatile storage device. In addition, processing may be performed using a logic circuit and/or an analog circuit in addition to the processor 1 and the storage device 2.

Figure 4:
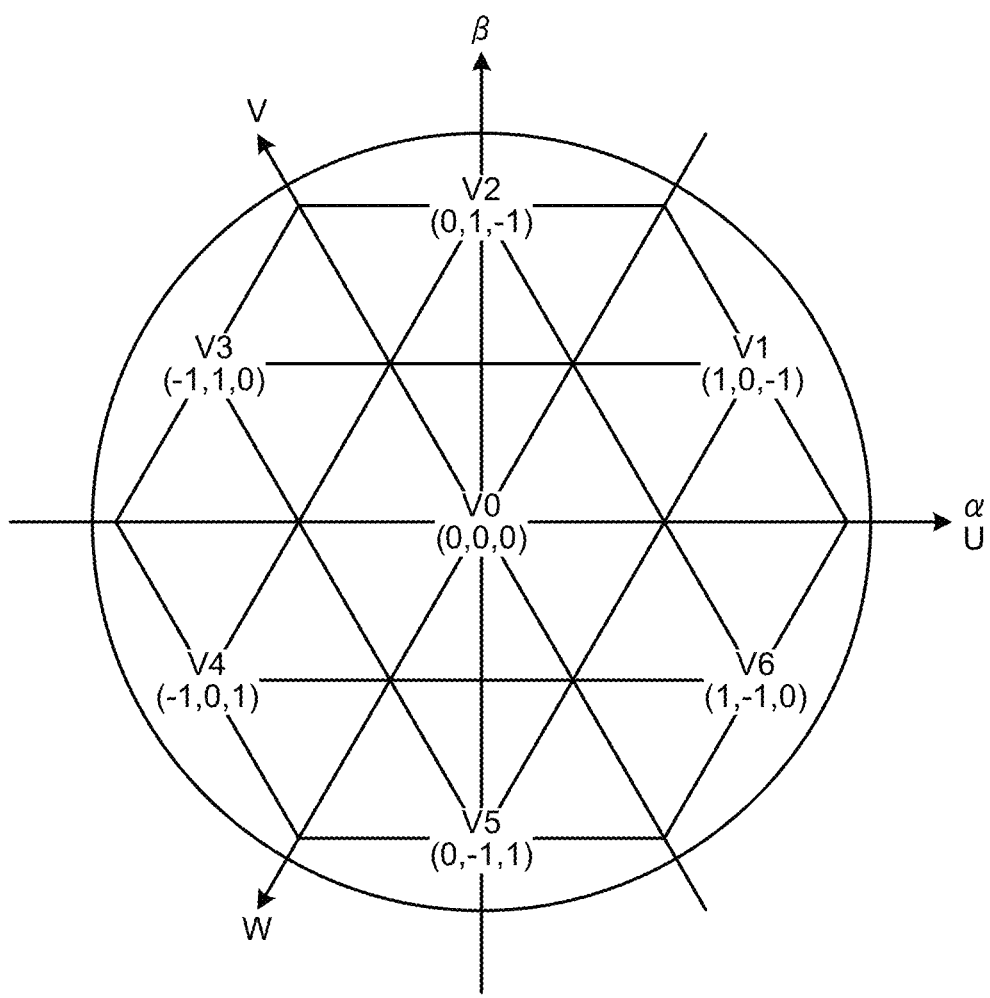
FIG. 4 is a voltage vector diagram for describing an operation of the switching signal generation unit in the embodiment.
Figure 5:
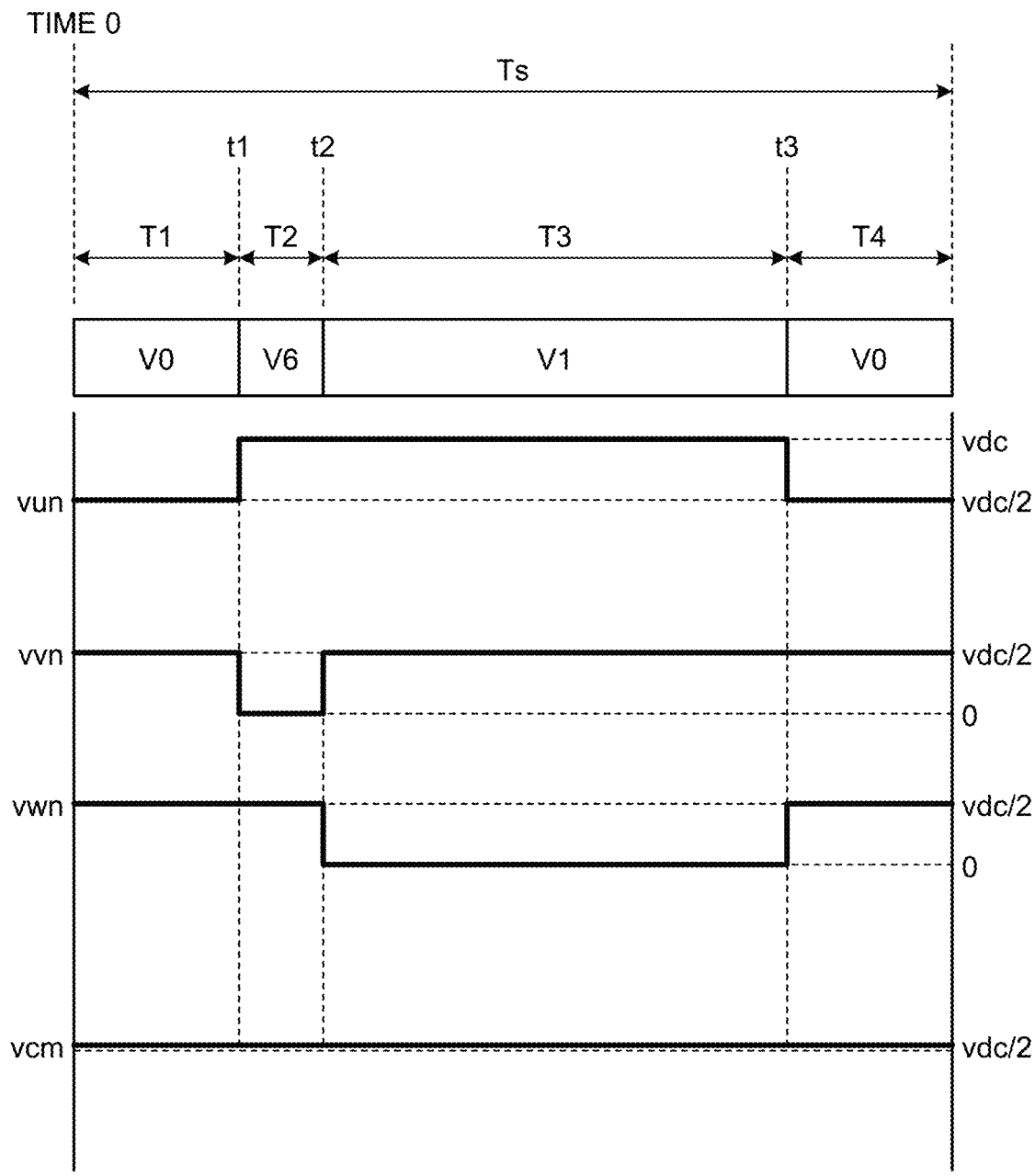
FIG. 5 is a first time chart for describing the operation of the switching signal generation unit in the embodiment.
Figure 6:
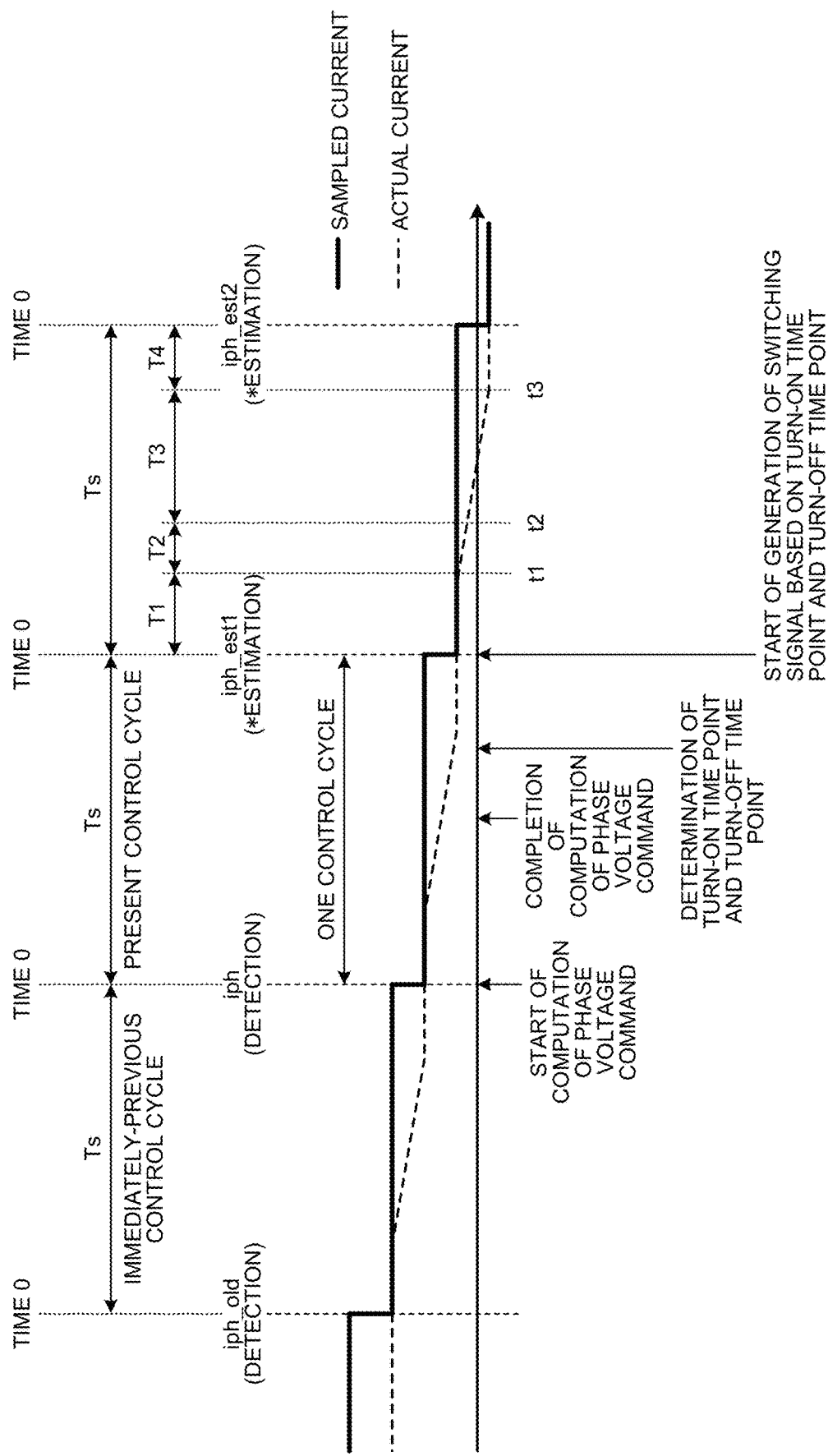
FIG. 6 is a second time chart for describing the operation of the switching signal generation unit in the embodiment.
Figure 7:
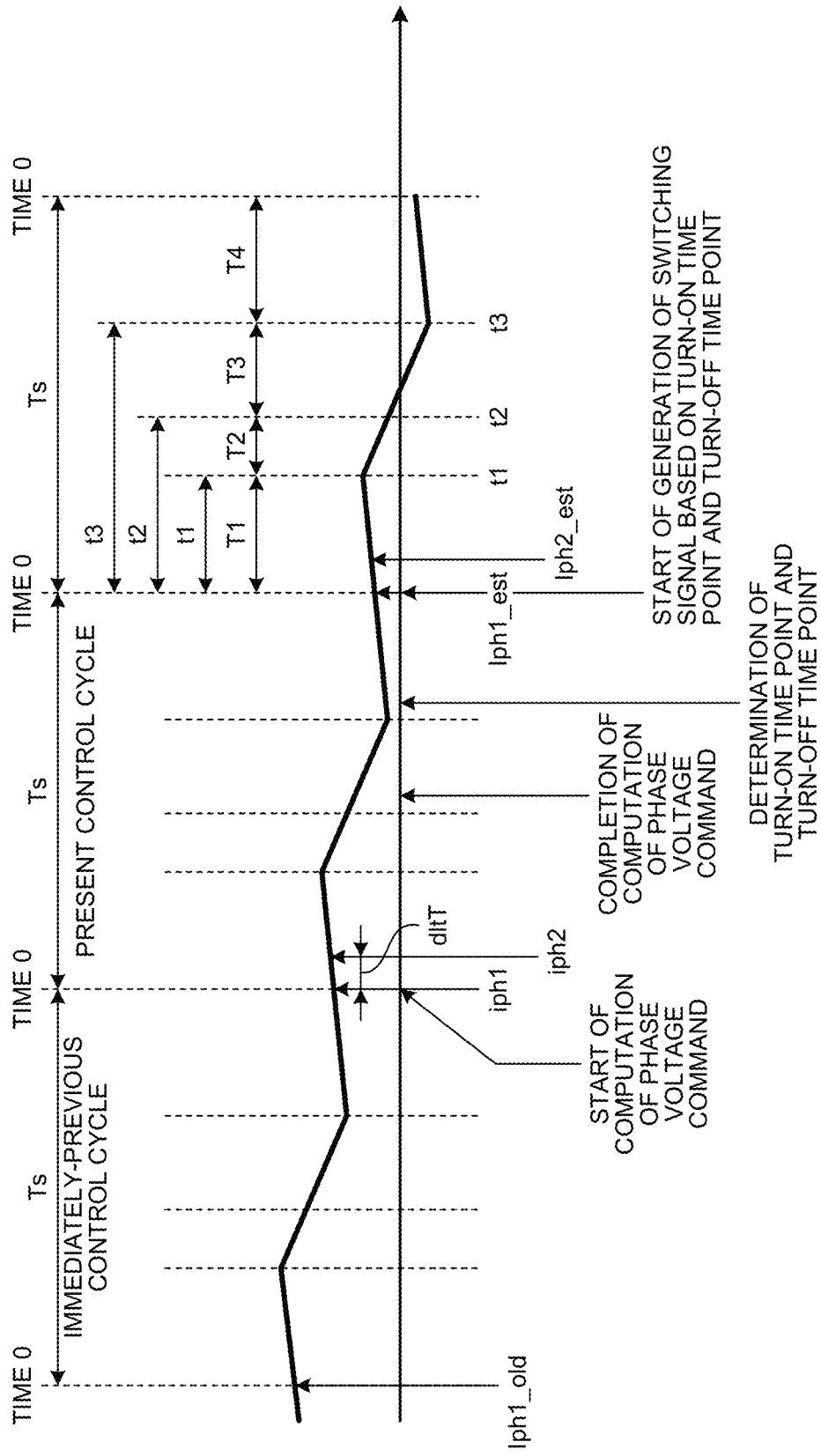
FIG. 7 is a third time chart for describing the operation of the switching signal generation unit in the embodiment.

An operation of the switching signal generation unit 50 in the embodiment will next be described with reference to the drawings from FIG. 4 to FIG. 7. FIG. 4 is a voltage vector diagram for describing an operation of the switching signal generation unit 50 in the embodiment. FIG. 5 is a first time chart for describing the operation of the switching signal generation unit 50 in the embodiment. FIG. 6 is a second time chart for describing the operation of the switching signal generation unit 50 in the embodiment. FIG. 7 is a third time chart for describing the operation of the switching signal generation unit 50 in the embodiment.

FIG. 4 illustrates output voltage vectors (hereinafter each referred to simply as "voltage vector") of the three-level inverter. A voltage vector is expressed as (u, v, w). The component "u" represents the voltage output state of phase U. The component "v" represents the voltage output state of phase V. The component "w" represents the voltage output state of phase W.

In the present embodiment, control is provided to synchronize the rising time point of raising the terminal voltage of one phase and the falling time point of lowering the terminal voltage of another phase, as a method for reducing electromagnetic noise due to an out-of-synchronization corresponding to the dead time. To provide this control, the switching signal generation unit 50 of the present embodiment only uses the six voltage vectors illustrated in FIG. 4, which causes no change in the three-phase common mode voltage. The voltage vectors are, V0(0, 0, 0), V1(1, 0, −1), V2(0, 1, −1), V3(−1, 1, 0), V4(−1, 0, 1), V5 (0, −1, 1), and V6 (1, −1, 0).

Note that each of the numerical values in parentheses of each voltage vector is one of "1" indicating a terminal voltage of Vdc, "0" indicating a terminal voltage of Vdc/2, and "−1" indicating a terminal voltage of 0.

Note that the common mode voltage is a voltage that may cause common mode noise. The common mode voltage is herein defined as a quotient of division by 3 of a sum of the phase-U terminal voltage vun, the phase-V terminal voltage vvn, and the phase-W terminal voltage vwn, i.e., (vun+vvn+vwn)/3.

The switching signal generation unit 50 calculates the voltage vectors to be output, and the output order and the output time periods of the voltage vectors, based on the phase voltage commands and on the present switching states of the respective switching elements. FIG. 5 illustrates, as a specific example, the output voltage vectors and the output time periods in a time chart when voltages are output that have phase angles in a range from −30 to 30 degrees on an αβ plane.

In FIG. 4, voltage vectors having phase angles in a range from −30 to 30 degrees on the αβ plane are three voltage vectors that are V0(0, 0, 0), V1(1, 0, −1), and V6(1, −1, 0), and these V0, V1, and V6 are thus used. The example of FIG. 5 is a case in which voltage vectors V0, V6, V1, and V0 are sequentially output for respective time periods T1, T2, T3, and T4 in this order. Time periods T1 to T4 for outputting the voltage vectors conform to a conventional space vector modulation scheme, and detailed description thereof will therefore be omitted. Note that time periods T1 to T4 and a control cycle Ts have a relationship of Ts=T1+T2+T3+T4. In addition, obviously, the ratio between time period T1 and time period T2 determines the direction of a voltage vector on the αβ plane, and the ratio of the sum of the time period T1 and time period T2 to the control cycle Ts determines the magnitude of a voltage vector on the αβ plane.

Next, the switching signal generation unit 50 determines the output order and the phases of the voltage vectors to determine the rising time point and the falling time point of the terminal voltage of each phase.

According to the example illustrated in FIG. 5, the phase-U terminal voltage is determined to be "Vdc/2" during a time period from time 0 to time t1, "Vdc" during a time period from time t1 to time t3, and "Vdc/2" during a time period from time t3 to the end of Ts; the phase-V terminal voltage is determined to be "Vdc/2" during a time period from time 0 to time t1, "0" during a time period from time t1 to time t2, and "Vdc/2" during a time period from time t2 to the end of Ts; and the phase-W terminal voltage is determined to be "Vdc/2" during a time period from time 0 to time t2, "0" during a time period from time t2 to time t3, and "Vdc/2" during a time period from time t3 to the end of Ts.

As seen from the description above, times t1, t2, and t3 can each be expressed as a transition time point of the corresponding terminal voltage. Note that times t1, t2, and t3 are each defined herein as the elapsed time with respect to time 0. With this definition, times t1, t2, and t3 have the following relationships with the above time periods T1, T2, and T3, during which the respective voltage vectors are output.

$$t1=T1$$

$$t2=T1+T2$$

$$t3=T1+T2+T3$$

According to the example illustrated in FIG. 5, the sum of the time periods in a low state of phase V and of phase W, in each of which the terminal voltage is caused to change from fall to rise in this order, is equal to the sum of the time periods in a high state of phase U, in which the terminal voltage is caused to transition from rise to fall in this order, during the time period from time 0 to the end of the control cycle Ts. Thus, the switching signal generation unit 50 may determine the switching signals so that the sum of the time periods in a low state of all the phases in each of which the terminal voltage is changed from fall to rise in this order, becomes equal to the sum of the time periods in a high state of all the phases in each of which the terminal voltage is caused to transition from rise to fall in this order, during one control cycle.

Note that the bottom portion of FIG. 5 illustrates the waveform of the common mode voltage vcm. When the common mode voltage vcm is calculated using its expression defined above, a constant value of "Vdc/2" is obtained as illustrated in the bottom portion of FIG. 5. This shows that the example illustrated in FIG. 5 of the set of voltage vectors, and the output order and the output time periods thereof can contribute to reduction in electromagnetic noise caused by the common mode voltage.

A current estimation computation performed in the switching signal generation unit 50 of the embodiment will next be described. FIG. 6 uses a time chart to illustrate the flow of process performed in the current estimation computation. FIG. 6 illustrates an actual current by the broken-line waveform, and a sampled current by the solid-line waveform. The sampled current waveform is a plot of current values estimated based on detection values detected by the current detector 16.

In FIG. 6, the switching signal generation unit 50 estimates current values iph_est1 and iph_est2, based on a phase current iph of that phase detected at time 0 in the present control cycle and on a phase current iph_old of that phase detected at time 0 in the immediately-previous control cycle. Time 0 is the time at the beginning of each control cycle. The current value iph_est1 is an estimated value of the current value in a control cycle that is one control cycle ahead with respect to time 0 of the present control cycle. The current value iph_est2 is an estimated value of the current value in a control cycle that is two control cycles ahead with respect to time 0 of the present control cycle.

In addition, the current value iph_est1 in a control cycle that is one control cycle ahead and the current value iph_est2 in a control cycle that is two control cycles ahead are current values to be used in generation of the switching signal. That is, the current value iph_est1 in a control cycle that is one control cycle ahead and the current value iph_est2 in a control cycle that is two control cycles ahead to be used in generation of the switching signal, are estimated based on the phase current iph detected in the present control cycle and on the phase current iph_old detected in the immediately-previous control cycle.

Note that as also illustrated in FIG. 6, time 0 of the present control cycle is the time to start computation of a phase voltage command. Computation of the phase voltage command is complete within the present control cycle. The turn-on time point, which is the time point to actually turn on a switching element, and the turn-off time point, which is the time point to actually turn off that switching element, is also determined within the present control cycle. Then, generation of the switching signal starts based on the turn-on time point and on the turn-off time point determined, with the start time being set to time 0 in a control cycle that is one control cycle ahead of time 0 of the present control cycle.

Assuming that each phase current changes linearly in a control cycle, the current value iph_est1 at time 0 of a control cycle that is one control cycle ahead, and the current value iph_est2 at time 0 of a control cycle that is two control cycles ahead, can be estimated using the following equations.

$$iph\_est1=iph+(iph-iph\_old) \quad (1)$$

$$iph\_est2=iph+2(iph-iph\_old) \quad (2)$$

As illustrated in FIG. 5, the zero voltage vector V0 is output at time 0, when each current value is estimated. When the rotary machine 20 is rotating at a low speed at the time of outputting the zero voltage vector V0, the inductive voltage generated in the rotary machine 20 is low, and the phase current value can therefore be considered to be changing very little. In this case, current values iph_t1, iph_t2, and iph_t3 at respective times t1, t2, and t3 can be estimated using the following equations.

$$iph\_t1=iph\_est1 \quad (3)$$

$$iph\_t2=iph\_est1+(iph\_est2-iph\_est1)\times(T2/(T2+T3)) \quad (4)$$

$$iph\_t3=iph\_est2 \quad (5)$$

On the contrary, when the current pulsates greatly due to switching operation, one effective measure is to detect the current multiple times around time 0 to estimate the amount of change in the current. FIG. 7 illustrates an example in which the phase current is detected twice around time 0.

As illustrated in FIG. 7, a first current value is denoted by iph1 and a second current value is denoted by iph2 which are detected around time 0 of the present control cycle. In addition, a first current value detected around time 0 in a control cycle that is prior to the present control cycle for one control cycle is denoted by iph1_old. In this situation, an estimated value iph1_est of the current at time 0 of a control cycle that is one control cycle ahead is calculated using the following equations.

$$iph\_dlt1 = iph1\_old - iph1 \quad (6)$$

$$iph1\_est = iph1 - iph\_dlt1 \quad (7)$$

Assuming that the current ripple has a constant slope in a control cycle, the current values iph_t1, iph_t2, and iph_t3 at respective times t1, t2, and t3 are estimated using the following equations.

$$iph\_dlt2 = (iph2 - iph1)/dltT \quad (8)$$

$$iph\_t1 = iph1\_est + T1 \times iph\_dlt2 \quad (9)$$

$$iph\_t3 = iph1\_est - iph\_dlt1 - T4 \times iph\_dlt2 \quad (10)$$

$$iph\_t2 = iph\_t1 + T2 \times (iph\_t3 - iph\_t1)/(t3 - t2) \quad (11)$$

Note that dltT in the right-hand side of Equation (8) above is the difference between the time at which the first current value iph1 is detected and the time at which the second current value iph2 is detected.

The current values iph_t1, iph_t2, and iph_t3 at respective times t1, t2, and t3 may be estimated using Equations (12) to (14) below instead of Equations (8) to (11) above.

$$iph\_t1 = iph\_est1 + E/R(1 - e^{(-T1/\tau)}) \quad (12)$$

$$iph\_t2 = iph\_t1 + E/R(1 - e^{(-T2/\tau)}) \quad (13)$$

$$iph\_t3 = iph\_t2 + E/R(1 - e^{(-T3/\tau)}) \quad (14)$$

In Equations (12) to (14) above, the "R" represents the resistance value of the rotary machine 20 when the rotary machine 20 is observed from the power converter 10. The "τ" is a time constant, and is given by τ=L/R. The "L" is the inductance value of the rotary machine 20 when the rotary machine 20 is observed from the power converter 10. The "E" represents the voltage generated at each phase terminal of the rotary machine 20, and is given by E=vph−vind−Vdc/2. The "vph" is the voltage applied to the rotary machine 20. The "wind" is the inductive voltage generated in the rotary machine 20. The "Vdc" is the bus voltage described above.

Note that the symbol "ph" in the current values iph_t1, iph_t2, and iph_t3 represents each phase of the three phases, that is, represents phase U, phase V, and phase W collectively. Thus, for example, "ph" is replaced with "u" or "U" to represent phase U. The phase-U current values at respective times t1, t2, and t3 are thus designated "iu_t1", "iu_t2", and "iu_t3". Similar notation is applied to phase V and phase W. In addition, similar notation is also applied to other parameters such as the phase voltage command, the switching signal, the turn-on time point, and the turn-off time point.

The switching signal generation unit 50 determines the polarity of current based on the current values iph_t1, iph_t2, and iph_t3 at respective times t1, t2, and t3 calculated above. The switching signal generation unit 50 also estimates the terminal voltage during a dead time based on the polarity of current. Note that the direction of flow into the rotary machine 20 is herein defined as positive, and the opposite direction as negative. Note also that this definition is merely for convenience, and the opposite definition may also be used, that is, the direction of flow out of the rotary machine 20 may be defined as positive.

A process of computing a switching time point performed in the switching signal generation unit 50 of the embodiment will next be described. The switching signal generation unit 50 first calculates the turn-on time point and the turn-off time point based on the current values iph_t1, iph_t2, and iph_t3 at respective times t1, t2, and t3.

In this respect, when the power converter 10 has the circuit configuration illustrated in FIG. 1, the conduction state combination of the switching elements can be in either the state (A) or the state (B) given below. Note that in the following description, "SW_ph1" to "SW_ph4" each represent a switching signal for controlling the conduction state, i.e., an On state or an Off state, of the corresponding one of the switching elements 13a to 13d, 14a to 14d, and 15a to 15d. In addition, "td" represents the "dead time" described above.

(State A): SW_ph2 indicates ON, SW_ph4 indicates OFF, and SW_ph1 and SW_ph3 indicate complementary switching (A-1): SW_ph1 indicates ON, SW_ph3 indicates OFF (A-2): SW_ph1 indicates OFF, SW_ph3 indicates OFF (A-3): SW_ph1 indicates OFF, SW_ph3 indicates ON The following is supplementary description of above (A-1) to (A-3).

(A-1): Terminal Voltage is "Vdc"

The switching elements 13a, 14a, and 15a are turned on, and the diodes of the switching elements 13c, 14c, and 15c are reverse-biased, thereby causing the positive potential of the DC power supply 11 to appear.

(A-2):

When iph_t<0: terminal voltage is "Vdc"

The current iph_t flows through the diode of the corresponding one of the switching elements 13a, 14a, and 15a, thereby causing the positive potential of the DC power supply 11 to appear.

When iph_t>0: terminal voltage is "Vdc/2"

The current iph_t flows through the diode of the corresponding one of the switching elements 13c, 14c, and 15c, thereby causing the neutral point potential to appear.

(A-3): Terminal Voltage is "Vdc/2"

The switching elements 13b, 13c, 14b, 14c, 15b, and 15c are simultaneously turned on, thereby causing the neutral point potential to appear.

(State B): SW_ph1 indicates OFF, SW_ph3 indicates ON, and SW_ph2 and SW_ph4 indicate complementary switching (B-1): SW_ph2 indicates ON, SW_ph4 indicates OFF (B-2): SW_ph2 indicates OFF, SW_ph4 indicates OFF (B-3): SW_ph2 indicates OFF, SW_ph4 indicates ON The following is supplementary description of above (B-1) to (B-3).

(B-1): Terminal Voltage is "Vdc/2"

The switching element 13b, 13c, 14b, 14c, 15b, and 15c are simultaneously turned on, thereby causing the neutral point potential to appear.

(B-2):

When iph_t<0: terminal voltage is "Vdc/2"

The current iph_t flows through the diode of the corresponding one of the switching elements 13b, 14b, and 15b, thereby causing the neutral point potential to appear.

When iph_t>0: terminal voltage is "0"

The current iph_t flows through the diode of the corresponding one of the switching elements 13d, 14d, and 15d, thereby causing the negative potential of the DC power supply 11 to appear.

(B-3): Terminal Voltage is "0"

The switching elements 13d, 14d, and 15d are turned on, and the diodes of the switching elements 13b, 14b, and 15b are reverse-biased, thereby causing the negative potential of the DC power supply 11 to appear.

Considering the conduction states of the switching elements described above, when the polarity of current at the time of switching is positive, the switching signal generation unit 50 advances, by a time period corresponding to the dead time, the turn-off time point of the switching element serving to switch the terminal voltage to the lower potential, and the turn-on time point of the switching element serving to switch the terminal voltage to the higher potential. Alternatively, when the polarity of current at the time of switching is negative, the switching signal generation unit 50 advances, by a time period corresponding to the dead time, the turn-off time point of the switching element serving to switch the terminal voltage to the higher potential, and the turn-on time point of the switching element serving to switch the terminal voltage to the lower potential.

As such, to control the phase-U terminal voltage as is illustrated in FIG. 5, that is, to be "Vdc/2" during a time period from time 0 to time t1, "Vdc" during a time period from time t1 to time t3, and "Vdc/2" during a time period from time t3 to the end of Ts, the conduction states of the phase-U switching elements are controlled as follows.

Time 0 to t1':

$$(SW\_U1, SW\_U2, SW\_U3, SW\_U4) = (0110) \quad (15)$$

Time t1' to t1'+td:

$$(SW\_U1, SW\_U2, SW\_U3, SW\_U4) = (0100) \quad (16)$$

Time t1'+td to t3':

$$(SW\_U1, SW\_U2, SW\_U3, SW\_U4) = (1100) \quad (17)$$

Time t3' to t3'+td:

$$(SW\_U1, SW\_U2, SW\_U3, SW\_U4) = (0100) \quad (18)$$

Time t3'+td to end of Ts:

$$(SW\_U1, SW\_U2, SW\_U3, SW\_U4) = (0110) \quad (19)$$

In the above description, the number shown in parentheses represents the conduction state of the corresponding switching element; "0" indicates that the switching element is OFF, and "1" indicates that the switching element is ON.

Times t1' and t3' are set as follows depending on the polarity of current at the time of switching and taking into consideration the potential of the terminal voltage during the dead time.

$$\text{When } iu\_t1 > 0, t1' = t1 - td \quad (20)$$

$$\text{When } iu\_t1 < 0, t1' = t1 \quad (21)$$

$$\text{When } iu\_t3 > 0, t3' = t3 \quad (22)$$

$$\text{When } iu\_t3 < 0, t3' = t3 - td \quad (23)$$

The following is supplementary description of Equations (20) to (23) above. In the cases of above (A-1) and (A-2), when iph_t<0, the terminal voltage remains "Vdc" even when the state transitions from (A-1) to (A-2). Meanwhile, when iph_t>0, the terminal voltage to change from "Vdc" to "Vdc/2" if the state transitions from (A-1) to (A-2). Accordingly, when iph_t<0, in which case no terminal voltage change occurs, calculated time t1 is used without change. Alternatively, when iph_t>0, in which case the terminal voltage changes, the dead time td is set to a time that is prior to time t1. A similar explanation applies to the case of time t3, at which time the voltage vector changes. Note that description thereof will be omitted here to avoid duplicate description.

Thus, the turn-on time points and the turn-off time points of the phase-U switching elements, i.e., tU1on, tU1off, tU2on, tU2off, tU3on, tU3off, tU4on, and tU4off, are set as follows.

$$SW\_U1: tU1on = t1' + td, tU1off = t3' \quad (24)$$

$$SW\_U2: \text{constantly On(no setting for } tU2on \text{ and } tU2off) \quad (25)$$

$$SW\_U3: tU3off = t1', tU3on = t3' + td \quad (26)$$

$$SW\_U4: \text{constantly Off(no setting for } tU4on \text{ and } tU4off) \quad (27)$$

The following is supplementary description of Equations (24) to (27) above. Looking at the numbers shown in parentheses of the right-hand sides in Equations (15) to (19) above, the numbers of SW_U2 are all "1", and the numbers of SW_U4 are all "0". This means that the switching element 13b is constantly ON, while the switching element 13d is constantly OFF. Therefore, it is not necessary to set the values of tU2on, tU2off, tU4on, and tU4off. In addition, SW_U1 changes from "0" to "1" at time t1'+td, and changes from "1" to "0" at time t3'. Accordingly, the values are set as given by Equation (24) above. Moreover, SW_U3 changes from "1" to "0" at time t1', and changes from "0" to "1" at time t3'+td. Accordingly, the values are set as given by Equation (26) above.

The phase-V terminal voltage and the phase-W terminal voltage will be described below similarly.

To control the phase-V terminal voltage as is illustrated in FIG. 5, that is, to be "Vdc/2" during a time period from time 0 to time t1, "0" during a time period from time t1 to time t2, and "Vdc/2" during a time period from time t2 to the end of Ts, the conduction states of the respective phase-V switching elements are controlled as follows.

Time 0 to t1':

$$(SW\_V1, SW\_V2, SW\_V3, SW\_V4) = (0110) \quad (28)$$

Time t1' to t1'+td:

$$(SW\_V1, SW\_V2, SW\_V3, SW\_V4) = (0010) \quad (29)$$

Time t1'+td to t2':

$$(SW\_V1, SW\_V2, SW\_V3, SW\_V4) = (0011) \quad (30)$$

Time t2' to t2'+td:

$$(SW\_V1, SW\_V2, SW\_V3, SW\_V4) = (0010) \quad (31)$$

Time t2'+td to end of Ts:

$$(SW\_V1, SW\_V2, SW\_V3, SW\_V4) = (0110) \quad (32)$$

Times t1' and t2' are set as follows depending on the polarity of current at the time of switching and taking into consideration the potential of the terminal voltage during the dead time.

When $iv\_t1>0, t1'=t1$ (33)

When $iv\_t1<0, t1'=t1-td$ (34)

When $iv\_t2>0, t2'=t2-td$ (35)

When $iv\_t2<0, t2'=t2$ (36)

The following is supplementary description of Equations (33) to (36) above. In the cases of above (B-2) and (B-3), when iph_t>0, the terminal voltage remains "0" even when the state transitions from (B-2) to (B-3). Meanwhile, when iph_t<0, the terminal voltage changes from "Vdc/2" to "0" if the state transitions from (B-2) to (B-3). Accordingly, when iph_t>0, in which case no terminal voltage change occurs, calculated time t1 is used without change. Alternatively, when iph_t<0, in which case the terminal voltage changes, the dead time td is set to a time that is prior to time t1. A similar explanation applies to the case of time t2, at which time the voltage vector changes. Note that description thereof will be omitted here to avoid duplicate description.

Thus, the turn-on time points and the turn-off time points of the phase-V switching elements, i.e., tV1on, tV1off, tV2on, tV2off, tV3on, tV3off, tV1on, and tV1off, are set as follows.

$SW\_V1$: constantly Off(no setting for $tV1$on and $tV1$off) (37)

$SW\_V2$: $tV2$off$=t1'$, $tV2$on$=t2'+td$ (38)

$SW\_V3$: constantly On(no setting for $tV3$on and $tV3$off) (39)

$SW\_V4$: $tV4$on$=t1'+td$, $tV4$off$=t2'$ (40)

The following is supplementary description of Equations (37) to (40) above. Looking at the numbers shown in parentheses of the right-hand sides in Equations (28) to (32) above, the numbers of SW_V1 is all "0", and the numbers of SW_V3 is all "1". This means that the switching element 14a is constantly OFF, while the switching element 14c is constantly ON. Therefore, it is not necessary to set the values of tV1on, tV1off, tV3on, and tV3off. In addition, SW_V2 changes from "1" to "0" at time t1', and changes from "0" to "1" at time t2'+td. Accordingly, the values are set as given by Equation (38) above. Moreover, SW_V4 changes from "0" to "1" at time t1'+td, and changes from "1" to "0" at time t2'. Accordingly, the values are set as given by Equation (40) above.

In addition, to control the phase-W terminal voltage as is illustrated in FIG. 5, that is, to be "Vdc/2" during a time period from time 0 to time t2, "0" during a time period from time t2 to time t3, and "Vdc/2" during a time period from time t3 to the end of Ts, the conduction states of the respective phase-W switching elements are controlled as follows.

Time 0 to t2':

$(SW\_W1, SW\_W2, SW\_W3, SW\_W4) = (0110)$ (41)

Time t2' to t2'+td:

$(SW\_W1, SW\_W2, SW\_W3, SW\_W4) = (0010)$ (42)

Time t2'+td to t3':

$(SW\_W1, SW\_W2, SW\_W3, SW\_W4) = (0011)$ (43)

Time t3' to t3'+td:

$(SW\_W1, SW\_W2, SW\_W3, SW\_W4) = (0010)$ (44)

Time t3'+td to end of Ts:

$(SW\_W1, SW\_W2, SW\_W3, SW\_W4) = (0110)$ (45)

Times t3' and t4' are calculated as follows depending on the polarity of current at the time of switching and taking into consideration the potential of the terminal voltage during the dead time.

When $iw\_t2>0, t2'=t2$ (46)

When $iw\_t2<0, t2'=t2-td$ (47)

When $iw\_t3>0, t3'=t3-td$ (48)

When $iw\_t3<0, t3'=t3$ (49)

The following is supplementary description of Equations (46) to (49) above. In the cases of above (B-2) and (B-3), when iph_t>0, the terminal voltage remains "0" even when the state transitions from (B-2) to (B-3). Meanwhile, when iph_t<0, the terminal voltage changes from "Vdc/2" to "0" if the state transitions from (B-2) to (B-3). Accordingly, when iph_t>0, in which case no terminal voltage change occurs, calculated time t2 is used without change. Alternatively, when iph_t<0, in which case the terminal voltage changes, the dead time td is set to a time prior to time t2. A similar explanation applies to the case of time t3, at which time the voltage vector changes. Note that description thereof will be omitted here to avoid duplicate description.

Thus, the turn-on time points and the turn-off time points of the phase-W switching elements, i.e., tW1on, tW1off, tW2on, tW2off, tW3on, tW3off, tW1on, and tW1off, are calculated as follows.

$SW\_W1$: constantly Off(no setting for $tW1$on and $tW1$off) (50)

$SW\_W2$: $tW2$off$=t2'$, $tW2$on$=t3'+td$ (51)

$SW\_W3$: constantly On(no setting for $tW3$on and $tW3$off) (52)

$SW\_W4$: $tW4$on$=t2'+td$, $tW4$off$=t3'$ (53)

The following is supplementary description of Equations (50) to (53) above. Looking at the numbers shown in parentheses of the right-hand sides in Equations (41) to (45) above, the numbers of SW_W1 are all "0", and the numbers of SW_W3 are all "1". This means that the switching element 15a is constantly OFF, while the switching element 15c is constantly ON. Therefore, it is not necessary to set the values of tW1on, tW1off, tW3on, and tW3off. In addition, SW_W2 changes from "1" to "0" at time t2', and changes from "0" to "1" at time t3'+td. Accordingly, the values are set as given by Equation (51) above. Moreover, SW_W4 changes from "0" to "1" at time t2'+td, and changes from "1" to "0" at time t3'. Accordingly, the values are set as given by Equation (53) above.

The switching signal generation unit 50 generates the switching signals based on the turn-on time points and on the turn-off time points of the switching elements determined in the above processing.

Note that the foregoing description has been provided with respect to an example of outputting the specific voltage vectors, but the situation is not limited to this example. Switching signals can also be generated for cases of outputting any voltage vectors by application of the above method of the embodiment.

Figure 8:
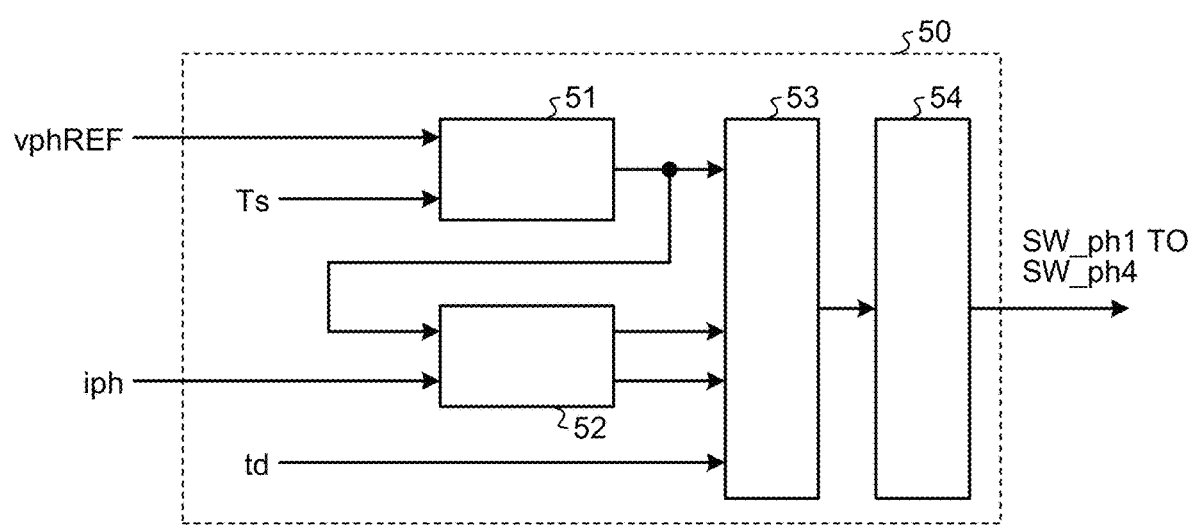
FIG. 8 is a block diagram illustrating a functional configuration of the switching signal generation unit in the embodiment.

FIG. 8 is a block diagram illustrating a functional configuration of the switching signal generation unit 50 in the embodiment. The switching signal generation unit 50 is divided into four functional blocks according to the functionality described above. Specifically, the switching signal generation unit 50 includes a transition time determination unit 51, a current estimation unit 52, a switching time computing unit 53, and a switching signal output unit 54.

Note that FIG. 8 uses symbols to indicate input signals into the units. The symbol "vphREF" represents the phase voltage command described above. The symbol "iph" represents the phase current. The symbol "Ts" represents the "control cycle" described above. The symbol "td" represents the "dead time" described above. The control cycle Ts is the period of updating the phase voltage command vphREF.

The transition time determination unit 51 determines transition time points of the terminal voltages. The phrase "transition time points of the terminal voltages" as used herein means the rising time point and the falling time point of the terminal voltage of each phase. As illustrated in FIG. 5, the transition time determination unit 51 determines the output order and the phases of the voltage vectors to determine the rising time point and the falling time point of the terminal voltage of each phase. One consideration in this operation is to synchronize the rising time point of raising the terminal voltage at a first junction point of a first single-phase leg, with the falling time point of lowering the terminal voltage at a second junction point of a second single-phase leg; or to synchronize the falling time point of lowering the terminal voltage at the first junction point of the first single-phase leg, with the rising time point of raising the terminal voltage at the second junction point of the second single-phase leg.

In the above description, the first single-phase leg is a leg of one phase among phase U, phase V, and phase W. The second single-phase leg is a leg of a phase different from the phase of the first single-phase leg. When assuming that the first single-phase leg is, for example, the leg of "phase U", and the second single-phase leg is, for example, the leg of "phase V", the first junction point is the "junction point 13e" and the second junction point is the "junction point 14e".

Time t1 in FIG. 5 is the time to raise the terminal voltage of phase U, and is the time to lower the terminal voltage of phase V. At time t1, the phase current iu_t1 of phase U and the phase current iv_t1 of phase V have an opposite phase relationship. Accordingly, iv_t1<0 is satisfied when iu_t1>0, and iv_t1>0 is satisfied when iu_t1<0. The relationships of Equations (20) and (34) above hold in the former case, while the relationships of Equations (21) and (33) hold in the latter case. It can be seen in either case that the times are synchronized with each other. Time t2 relates to a relationship between phase V and phase W, and time t3 relates to a relationship between phase U and phase W, and similar description applies to each of these cases.

As described above, the transition time determination unit 51 determines the rising time point and the falling time point of terminal voltages of two different phases to synchronize these two time points with each other. Synchronization of these two time points enables reduction in variation in the neutral point potential. This can reduce electromagnetic noise due to an out-of-synchronization corresponding to the dead time. Reduction in electromagnetic noise due to an out-of-synchronization corresponding to the dead time then enables size reduction of a noise filter.

Note that the present embodiment has been described in which, in a control cycle, both pairs of the time points are synchronized with each other, where these pairs are a first pair and a second pair. The first pair includes the rising time point of the terminal voltage of a first single-phase leg, and the falling time point of the terminal voltage of a second single-phase leg. The second pair includes the falling time point of the terminal voltage of the first single-phase leg, and the rising time point of the terminal voltage of the second single-phase leg. However, the synchronization operation is not limited thereto. Synchronization may be established between the time points of one of these pairs. Such control also has an effect of reducing electromagnetic noise due to an out-of-synchronization corresponding to the dead time.

The current estimation unit 52 estimates the phase current at the switching based on the rising time point and the falling time point of the terminal voltage of each phase. In addition, the current estimation unit 52 determines the polarity of current corresponding to the estimated value of the phase current, and outputs the determination result to the switching time computing unit 53.

The current estimation unit 52 estimates the phase current each at the rising time point and at the falling time point of a terminal voltage, based on a detection value of the phase current in a previous control cycle. The phase current is preferably estimated based on a detection value of the phase current detected in a control cycle that is prior by at least two control cycles as also illustrated in FIG. 6 by way of example, or on detection values of the phase current detected at least twice during one control cycle. This operation can improve accuracy of the estimated value. This operation also enables estimation of a current at a switching time point in the next control cycle from previous and present detection values to determine the polarity of current.

The phase current may also be estimated based on a detection value of the phase current in the present control cycle, the voltage applied to the rotary machine 20, and the impedance of the flow path of the phase current. In this case, a current at a switching time point in the next control cycle can be estimated from the present detection value to determine the polarity of current.

In addition, in estimation of the phase current, the phase current at the rising time point of the terminal voltage and the phase current at the falling time point of the terminal voltage are preferably estimated separately for each of legs belonging to one phase. In this case, it is possible to determine the polarity of current during a dead time based on individual currents in turn-on operation and in turn-off operation of a switching element, thereby enabling the polarity of current to be determined with higher accuracy. This operation can prevent decrease in the noise reduction effect, resulting from erroneous determination of the polarity of current.

The switching time computing unit 53 computes the turn-on time point and the turn-off time point of a switching signal. Specifically, when the polarity of the phase current at the time of switching is positive, the switching time computing unit 53 provides control to advance, by a time period corresponding to the dead time, the turn-off time point of the switching element serving to switch the terminal voltage to the lower potential, and the turn-on time point of the switching element serving to switch the terminal voltage to the higher potential. Alternatively, when the polarity of the phase current at the time of switching is negative, the switching time computing unit 53 provides control to advance, by a time period corresponding to the dead time, the turn-off time point of the switching element serving to switch the terminal voltage to the higher potential, and the turn-on time point of the switching element serving to switch the terminal voltage to the lower potential.

Performing the foregoing control enables a switching signal to be generated that compensates the out-of-synchronization during a dead time. This enables reduction in electromagnetic noise due to an out-of-synchronization corresponding to the dead time.

Figure 9:
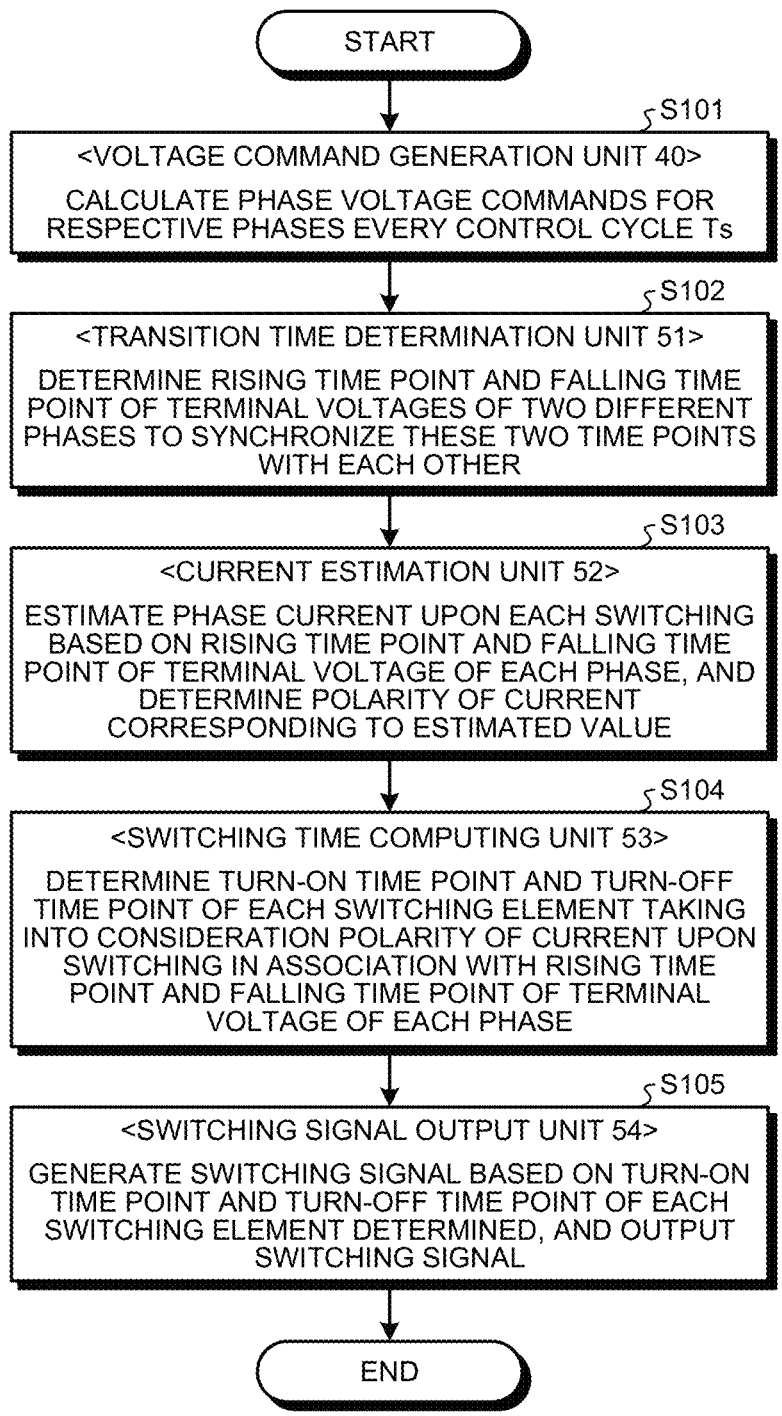
FIG. 9 is a flowchart illustrating a flow of operation performed in the control device of the embodiment.

FIG. 9 is a flowchart illustrating a flow of operation performed in the control device 30 of the embodiment. FIG. 9 illustrates a flow of the foregoing processing performed in the control device 30 of the embodiment.

The voltage command generation unit 40 calculates phase voltage commands, which are voltage commands for the respective phases, every control cycle Ts (step S101). The transition time determination unit 51 determines the rising time point and the falling time point of terminal voltages of two different phases to synchronize these two time points with each other (step S102).

The current estimation unit 52 estimates the phase current at each switching based on the rising time point and the falling time point of the terminal voltage of each phase, and determines the polarity of current corresponding to the estimated value (step S103). The switching time computing unit 53 determines the turn-on time point and the turn-off time point of each switching element taking into consideration the polarity of current at the time of switching, in association with the rising time point and the falling time point of the terminal voltage of each phase (step S104).

Then, the switching signal output unit 54 generates switching signals based on the turn-on time point and the turn-off time point of each switching element determined at step S104, and outputs the switching signals (step S105).

Figure 10:
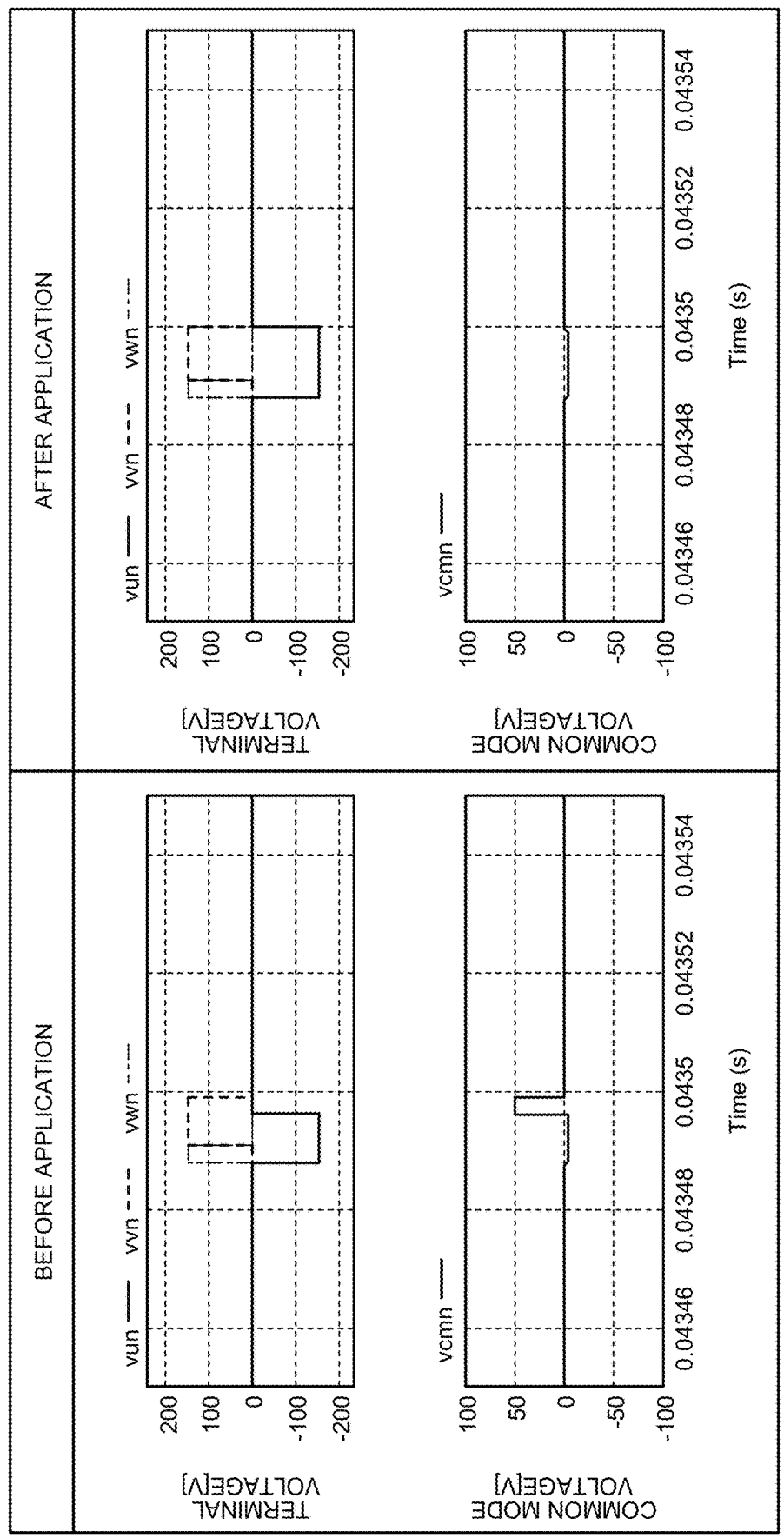
FIG. 10 is a chart for comparing operation waveforms before and after application of a control method according to the embodiment.

FIG. 10 is a chart for comparing operation waveforms before and after application of the control method according to the embodiment. In FIG. 10, the left portion of the page illustrates operation waveforms before application, and the right portion of the page illustrates operation waveforms after application. The upper sections each illustrate variations in the terminal voltages vun, vvn, and vwn, and the lower sections each illustrate a variation in the common mode voltage vcm. The horizontal axes represent time, and the vertical axes represent voltage. Note that the upper sections each illustrate the phase U, phase V, and phase W waveforms respectively using a solid line, a broken line, and a dashed-and-dotted line.

An out-of-synchronization is present in the latter half of the pulse-shaped waveform in the set of waveforms before application. This causes a variation in the common mode voltage as illustrated in the corresponding lower section. In contrast, the out-of-synchronization has vanished in the set of waveforms after application, and the variation in the common mode voltage is thus reduced. This result explains effectiveness of the control method of the present embodiment.

As described above, according to the power conversion device according to the embodiment, the control device generates switching signals so that time points of at least one of pairs are synchronized with each other. A first pair and a second pair constitute the pairs. The first pair includes a time point of raising a terminal voltage at a first junction point of a first single-phase leg, and a time point of lowering a terminal voltage at a second junction point of a second single-phase leg. The second pair includes a time point of lowering the terminal voltage at the first junction point and a time point of raising the terminal voltage at the second junction point. The control device determines the time point to turn on or turn off the upper arm switching element and the time point to turn on or turn off the lower arm switching element based on phase currents at the rising time point and at the falling time point of the terminal voltages. Such control enables variation in the neutral point potential to be reduced. This can reduce electromagnetic noise due to an out-of-synchronization corresponding to the dead time. Reduction in electromagnetic noise due to an out-of-synchronization corresponding to the dead time then enables size reduction of a noise filter.

Figure 11:
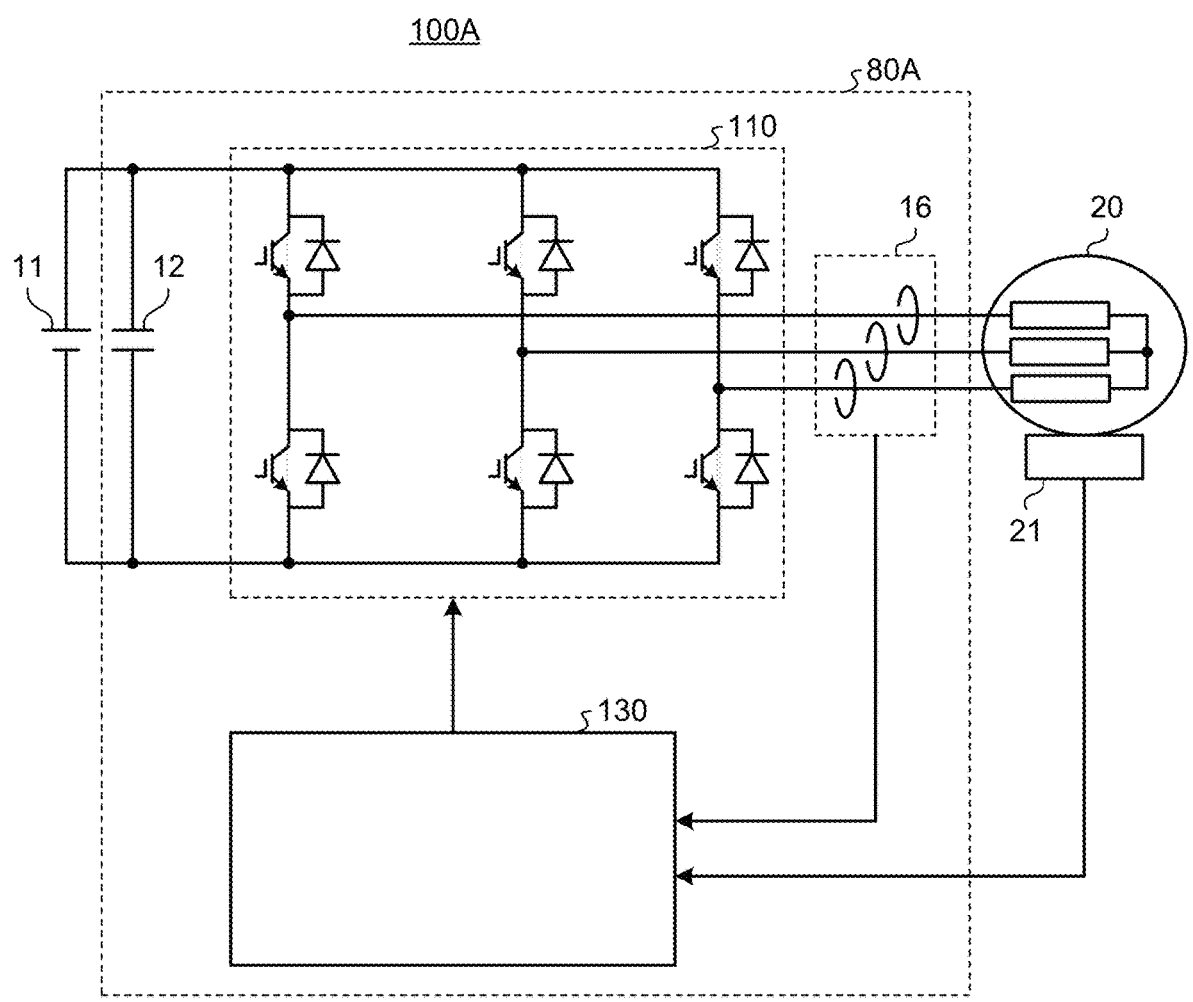
FIG. 11 is a diagram illustrating a configuration of a rotary machine drive system according to a first variation of the embodiment.
Figure 12:
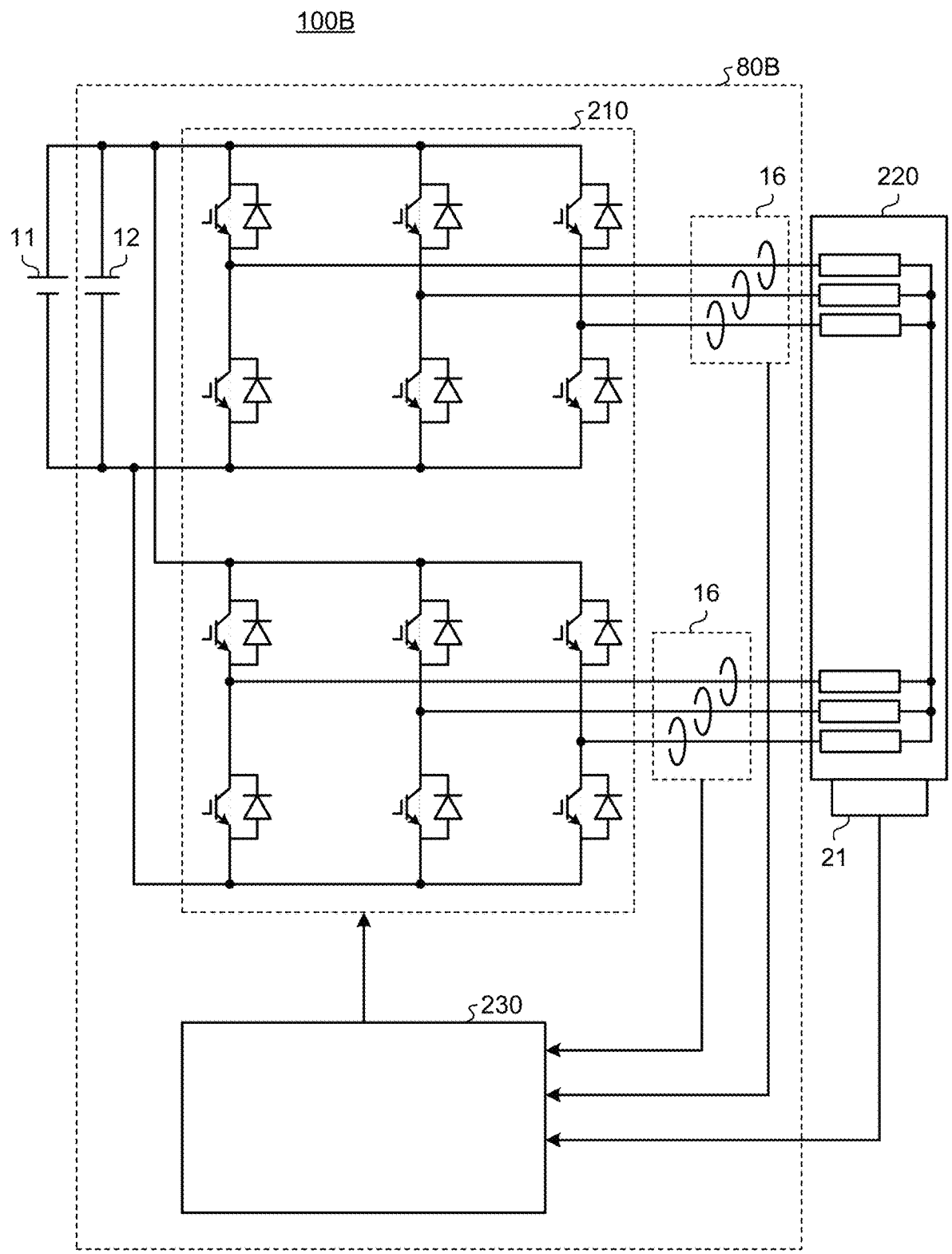
FIG. 12 is a diagram illustrating a configuration of a rotary machine drive system according to a second variation of the embodiment.
Figure 13:
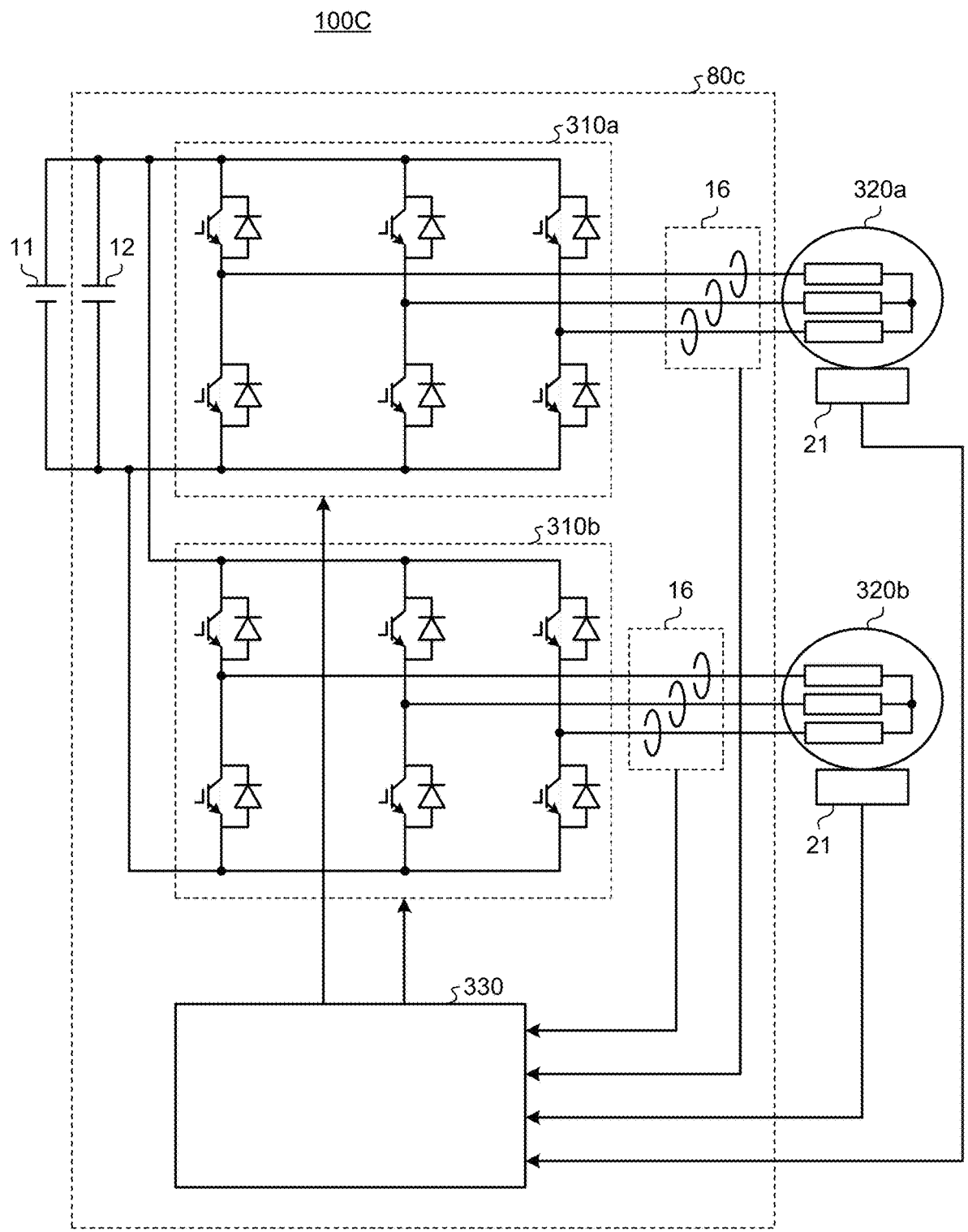
FIG. 13 is a diagram illustrating a configuration of a rotary machine drive system according to a third variation of the embodiment.

Note that although the present embodiment has been described with respect to an example in which the power conversion device 80 is configured as a T-type three-level inverter, the configuration is not limited to such configuration. As illustrated in FIGS. 11 to 13, another type of inverter may be used. FIG. 11 is a diagram illustrating a configuration of a rotary machine drive system 100A according to a first variation of the embodiment. FIG. 12 is a diagram illustrating a configuration of a rotary machine drive system 100B according to a second variation of the embodiment. FIG. 13 is a diagram illustrating a configuration of a rotary machine drive system 100C according to a third variation of the embodiment.

The rotary machine drive system 100A illustrated in FIG. 11 includes a power conversion device 80A in place of the power conversion device 80 illustrated in FIG. 1. The power conversion device 80A includes a power converter 110 in place of the power converter 10, a capacitor 12 in place of the capacitors 12a and 12b, and a control device 130 in place of the control device 30. The power converter 110 has a circuit configuration called three-phase full-bridge inverter. A three-phase full-bridge inverter is a two-level inverter.

The foregoing control method of the embodiment is also applicable to the rotary machine drive system 100A including the power converter 110 as described above. Accordingly, incorporation of the functionality of the switching signal generation unit 50 described above into the control device 130 can provide the foregoing advantage of the embodiment.

In addition, the rotary machine drive system 100B illustrated in FIG. 12 includes a power conversion device 80B in place of the power conversion device 80 illustrated in FIG. 1. The power conversion device 80B includes a power converter 210 in place of the power converter 10, the capacitor 12 in place of the capacitors 12a and 12b, and a control device 230 in place of the control device 30. A rotary machine 220 to be driven is a six-phase motor, which is an example of a multiphase motor. The power converter 210 uses a six-phase full-bridge inverter to serve the rotary machine 220. A six-phase full-bridge inverter is an example of multiphase inverter. A six-phase full-bridge inverter has a circuit configuration of two three-phase full-bridge inverters being connected in parallel with each other.

The foregoing control method of the embodiment is also applicable to the rotary machine drive system 100B including the power converter 210 as described above. Accordingly, incorporation of the functionality of the switching signal generation unit 50 described above into the control device 230 can provide the foregoing advantage of the embodiment.

Moreover, the rotary machine drive system 100C illustrated in FIG. 13 includes a power conversion device 80C in place of the power conversion device 80 illustrated in FIG. 1. The power conversion device 80C includes two power converters 310a and 310b connected in parallel with each other, in place of the single power converter 10, and includes a capacitor 12 in place of the capacitors 12a and 12b, and a control device 330 in place of the control device 30. The power converters 310a and 310b, each of which is a three-phase full-bridge inverter, are connected in parallel with each other to the capacitor 12. The power converter 310a is connected with a rotary machine 320a to be driven, and the power converter 310b is connected with a rotary machine 320b to be driven.

The foregoing control method of the embodiment is also applicable to the rotary machine drive system 100C that includes the power converters 310a and 310b as described above. Accordingly, incorporation of the functionality of the switching signal generation unit 50 described above into the control device 330 can provide the foregoing advantage of the embodiment.

Note that although the present embodiment has been described with respect to a converter that converts DC power into AC power, this disclosure is not limited such converter. This disclosure is also applicable to power converters that perform converting from AC power to DC power, from DC power to DC power, and from AC power to AC power, and such power converters can also provide an advantage similar to the foregoing advantage of the embodiment.

Note that although various examples have herein been described by way of example, one or various multiple features, aspects, and capabilities as herein described are not only applicable to a specific example, but may also be applied solely or in various combinations. Accordingly, a significant number of undescribed variations are conceivable within the scope of the technology disclosed herein. For example, modification, addition, and removal of at least one component, and moreover, use of at least one component in combination with a component of another example, are also within the scope of the present disclosure.

REFERENCE SIGNS LIST 1 processor; 2 storage device; 10, 110, 210, 310a, 310b power converter; 11 DC power supply; 12, 12a, 12b capacitor; 12c, 13e, 14e, 15e junction point; 13a, 13b, 13c, 13d, 14a, 14b, 14c, 14d, 15a, 15b, 15c, 15d switching element; 16 current detector; 17 DC bus; 18 DC bus; 20, 220, 320a, 320b rotary machine; 21 angle detector; 22 three-phase winding; 24U phase-U terminal; 24V phase-V terminal; 24W phase-W terminal; 30, 130, 230, 330 control device; 40 voltage command generation unit; 50 switching signal generation unit; 51 transition time determination unit; 52 current estimation unit; 53 switching time computing unit; 54 switching signal output unit; 80, 80A, 80B, 80C power conversion device; 100, 100A, 100B, 100C rotary machine drive system.

The invention claimed is:

1. A power conversion device for converting direct current power into three-phase alternating current power for a load, the power conversion device comprising:
 a power converter including a plurality of single-phase legs being connected in parallel with one another, each of the plurality of single-phase legs including an upper arm switching element and a lower arm switching element connected in series with each other, the upper arm switching element and the lower arm switching element being connected to each other at a junction point, the junction point being connected to the load;
 a processor; and
 a memory to store a program which, when executed by the processor, performs processes of:
   controlling switching operation of the upper arm switching element and of the lower arm switching element, wherein the processor generates switching signals so that time points of at least one of pairs are synchronized with each other,
   the pairs being constituted by a first pair and a second pair,
   the first pair including a rising time point of raising a terminal voltage at a first junction point of a first single-phase leg, and a falling time point of lowering a terminal voltage at a second junction point of a second single-phase leg,
   the second pair including a falling time point of lowering the terminal voltage at the first junction point and a rising time point of raising the terminal voltage at the second junction point,
   the first junction point and the second junction point each being connected to the load, and
   the processor determines a time point to turn on or turn off the upper arm switching element and a time point to turn on or turn off the lower arm switching element based on phase currents at the rising time point and at the falling time point of the terminal voltages.

2. The power conversion device according to claim 1, wherein the processor further estimates the phase currents at the rising time point and at the falling time point of the terminal voltages based on detection values of the phase currents in a previous control cycle.

3. The power conversion device according to claim 2, wherein
 the processor estimates the phase currents respectively at the rising time point and at the falling time point of the terminal voltages based on a detection value of the phase current detected in a control cycle that is prior by at least two control cycles.

4. The power conversion device according to claim 2, wherein
 the processor estimates the phase currents at the rising time point and at the falling time point of the terminal voltages based on detection values of the phase currents detected at least twice during one control cycle.

5. The power conversion device according to claim 2, wherein
 the processor separately estimates, for each of the legs belonging to one phase, a value of the phase current at the rising time point of a corresponding one of the terminal voltages and a value of the phase current at the falling time point of the corresponding one terminal voltage.

6. The power conversion device according to claim 1, wherein the processor estimates the phase currents at the rising time point and at the falling time point of the terminal voltages based on detection values of the phase currents in a present control cycle, a voltage applied to the load, and impedance of a flow path of the phase currents.

7. The power conversion device according to claim 6, wherein
 the processor separately estimates, for each of the legs belonging to one phase, a value of the phase current at the rising time point of a corresponding one of the terminal voltages and a value of the phase current at the falling time point of the corresponding one terminal voltage.

8. The power conversion device according to claim 1, wherein
 the processor advances, by a time period corresponding to a dead time, a turn-off time point of one of the switching elements serving to switch a corresponding one of the terminal voltages to a lower potential and a turn-on time point of one of the switching elements serving to switch a corresponding one of the terminal voltages to a higher potential when a polarity of the phase current at a time of switching is positive, and to advance, by the time period corresponding to the dead time, a turn-off time point of one of the switching elements serving to switch a corresponding one of the terminal voltages to a higher potential and a turn-on time point of one of the switching elements serving to switch a corresponding one of the terminal voltages to a lower potential when the polarity of the phase current at a time of switching is negative.

9. The power conversion device according to claim 1, wherein the processor determines the switching signals so that a sum of time periods in a low state of all phases in each of which the terminal voltage is changed from fall to rise in this order becomes equal to a sum of time periods in a high state of all phases in each of which the terminal voltage is caused to transition from rise to fall in this order, during one control cycle.

10. A rotary machine drive system comprising:

the power conversion device according to claim 1, wherein the load is a rotary machine, and the rotary machine is driven by electrical power supplied from the power conversion device.

* * * * *